Aug. 1, 1961

L. PÉRAS 2,994,571

PISTON AND ROD PACKINGS

Filed Feb. 28, 1958

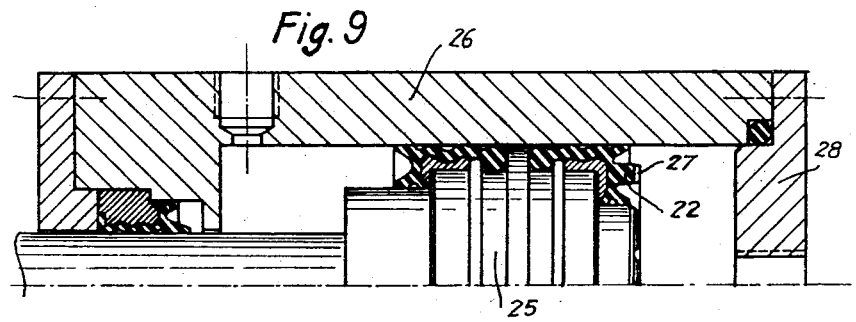
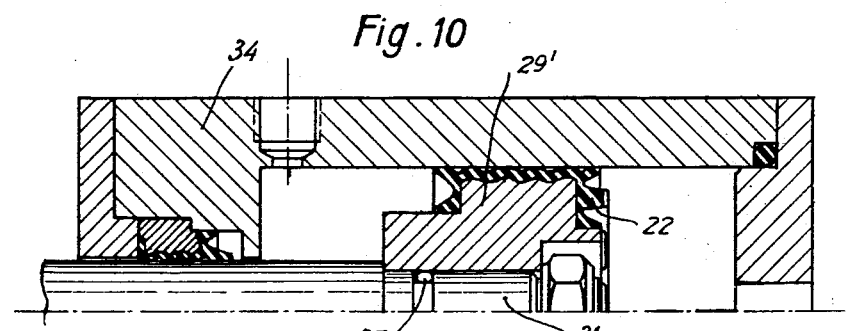
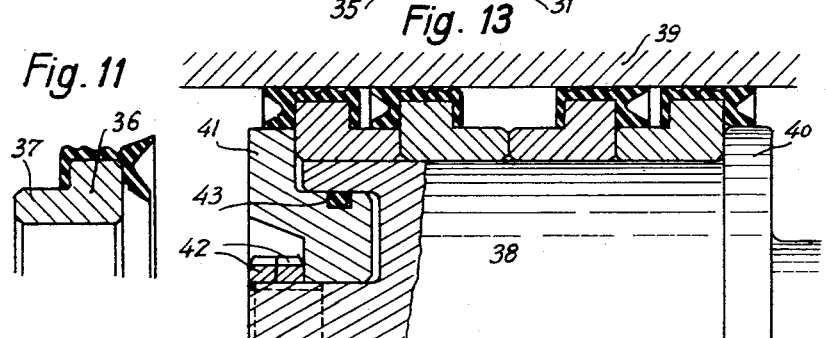
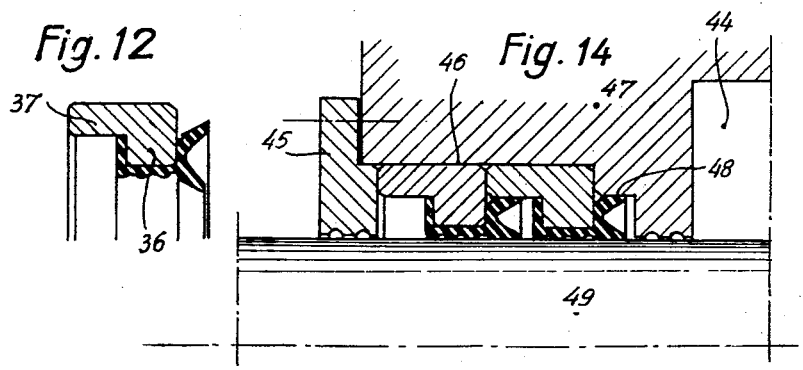

United States Patent Office 2,994,571
Patented Aug. 1, 1961

2,994,571
PISTON AND ROD PACKINGS
Lucien Péras, Billancourt, France, assignor to Regie Nationale des Usines Renault, Billancourt, France, French works
Filed Feb. 28, 1958, Ser. No. 718,358
Claims priority, application France Mar. 5, 1957
13 Claims. (Cl. 309—23)

The present invention relates in general to sliding contact packings and has specific reference to packings designed to form a fluid-tight joint in mechanical assemblies comprising a rod or piston sliding in a cylinder containing a fluid under pressure, as in pumps, rams or the like.

It is the essential object of this invention to provide packings adapted to withstand extremely high service pressures without undergoing any exaggerated deflexion.

It is well known that when a resilient packing is subjected to a relatively high pressure, the reduction in volume taking place therein increases in proportion to the pressure and varies according to the material of which the packing is made, for example rubber or plastics. As a rule, this deformation of the packings—in the case of high pressure conditions—even if it remains within the limits of elastic deformation offers several drawbacks; thus, the crushing of the packing or packings is most likely to alter the operating characteristics of the apparatus in which the packing or packings are mounted; their longitudinal compression creates a strong transverse component producing additional friction and therefore a relatively rapid wear of the packing or packings which is attended by a substantial decrease in the efficiency of the apparatus.

According to this invention and in view of avoiding these drawbacks, the improvements introduced consist in so designing the operative portion of the packing that it will resist compressive stress while preserving the minimum flexibility required for sealing the joint between the parts concerned, this operative portion of resilient material such as rubber or the like being vulcanized on a metal support so as to form an integral part thereof and receive therefrom an exceptionally high resistance to compressive stress. The packings are of the type formed with two sealing lips curved towards the side to be protected from leakage, one lip being slidable and the other being fixed or static, the packing body from which these lips extend being elongated in the direction of the sliding movement and formed with circular beads constituting guide bearings to protect the aforesaid lips from possible transverse stresses.

According to a typical embodiment of these completely resilient packings and in view of their use in apparatus operating under high pressure conditions, it has been proposed to reduce the pressure-receiving portion of the packing body, the latter being backed on the one hand by a shoulder formed on the member on which it is fitted, and on the other hand resiliently anchored beyond this shoulder.

According to the improved embodiment proposed in this description as the packing is vulcanized on a metal support formed preferably with fitting portions, a practically indestructible connection is obtained between the operative portion and the support, this connection being considerably better than that of a resilient packing completely separate from, and partially anchored on, the support, with or without the assistance of an elastic clamping action. This intimate connection or mounting of the operative portion of the packing and the metal support, on the one hand, and the resistance to flexure imparted by this support to the packing body, on the other hand, are such that the packing can operate successfully under very high pressure conditions with the same flexibility and efficiency as conventional packings operate under normal pressure conditions.

In a construction according to the present invention the packing can be mounted very easily either by assembling one portion of the support with the part to be sealed, or by anchoring a resilient portion of the packing which in this case will form an extension of the operative portion thereof to the rear relative to the direction in which the pressure is exerted.

This invention is also concerned with a specific form of embodiment of the packings broadly set forth hereinabove, which is adapted to permit their juxtaposition and the building of a sealing device comprising several separate packings assembled to form a unidirectional or bidirectional sealing unit. It is also worth pointing out the advantage of the packings according to this invention that a very important feature thereof is that the metal support will safely prevent the packing from undergoing a deformation, whatever its cause, for example when it is kept a very long time in storage, attacked by certain oil types, by high temperatures, etc.

If the packings according to this invention are mounted in a pre-stressed condition, the slight variation occurring in their dimensions does not constitute an appreciable drawback, as the packings will necessarily accommodate the diameter of the rod or piston on which they are positioned; however, if the packing fits freely or unstressed in a cavity, any dimensional variation is most likely definitely to impair its sealing properties.

The packings according to this invention are free from any risk of the character set forth in the preceding paragraph.

In order to afford a clearer understanding of this invention and of the manner in which the same may be carried out in practice, reference will now be made to the accompanying drawings forming part of this specification and illustrating diagrammatically by way of example a few typical embodiments of the invention. In the drawings:

FIGURES 9 and 10 are longitudinal half-sections illustrating fluid-actuated cylinders incorporating the packings of this invention;

FIGURES 11 and 12 are longitudinal half-sections illustrating a packing adapted, in combination with other similar packings, to constitute a sealing unit;

FIGURE 13 is a longitudinal axial half-section illustrating a piston provided with bidirectional sealing means consisting of a plurality of juxtaposed packings of the type shown in FIG. 11, and FIGURE 14 is a similar view illustrating a gland-sealing assembly consisting of packings of the type shown in FIG. 12.

Figure 1:
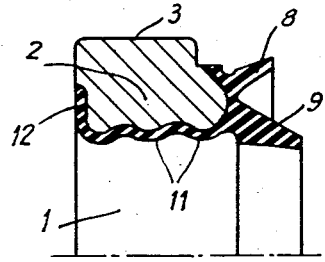
FIGURES 1 and 2 are longitudinal half-sections illustrating a gland packing shown in its unstressed and mounted conditions, respectively.
Figure 2:
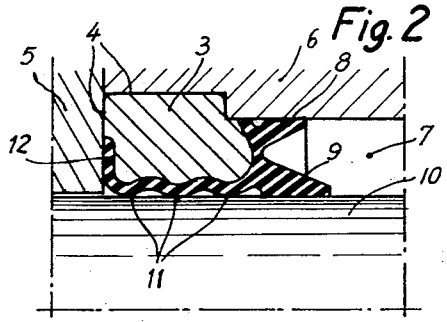

Referring firstly to FIGS. 1 and 2 of the drawings, the gland packing illustrated therein consists of a portion 1 of resilient material which is vulcanized on a metal support 2 formed with an assembling portion corresponding in shape to an annular recess 4 in which the packing can be fitted between members 5 and 6. The operative portion of the packing comprises two lips 8, 9 inclined relative to the packing axis and extending toward the pressure side of the packing. The outer lip 8 is static and engages the outer case, and the inner lip 9 engages the sliding rod or like members 10; when fitted as shown in FIG. 2 these lips are slightly prestressed, as will be clearly seen by comparing this figure with FIG. 1. This operative portion is formed with an inner extension along the rod 10 to constitute an efficient guide therefor. This extension comprises annular beads or corrugations 11 acting as a bearing without causing any excessive friction or impairing the flexibility of the lips.

From the foregoing it is clear that the packing thus constructed will maintain its shape and dimension irrespective of the service pressure to which it is subjected, this pressure reinforcing, as usually desired, the sealing contact of the lips, whereas the bearing portion 11 is protected against any undesired and detrimental swelling and clamping effect relative to the rod 10 as would occur with a packing of the same shape but made entirely of resilient material. Finally, it will be noted that the connection between the resilient portion 1 and the rigid support 2 is reinforced by the presence of beads on the support 2 which are located beneath and correspond to the beads 11 of the resilient portion of the packing, and also by the fact that this resilient portion is formed with a rear flange 12 extending radially outwards; this flange 12 fits preferably in an annular recess formed in the support 2 and is clamped thereagainst by the member 5.

Figure 3:
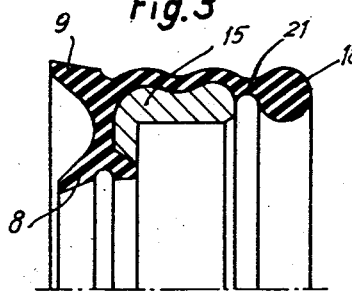
FIGURES 3 and 4 are similar views showing a unidirectional piston packing.
Figure 4:
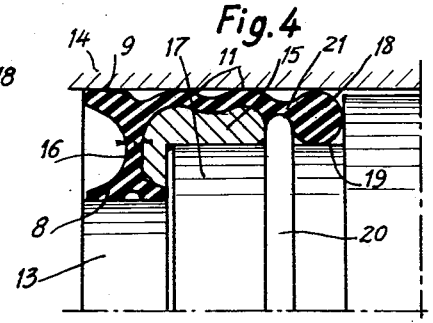

In the example of the piston packing illustrated in FIGS. 3 and 4, the operative or sealing portion of this unidirectional sealing device consists of a static lip 8 engaging the piston 13, a sliding lip 9 contacting the cylinder wall 14, and an annular portion formed with beads 11 acting as a bearing in the cylinder. This substantially L-shaped operative portion (when seen in radial section) is vulcanized on a support 15 also of L-shape; the lip carrying arm extending toward the pressure side offers to the fluid pressure only a thickness 16 of extremely low or negligible compressibility as far as the efficiency of the packing is concerned, whereas the other corrugated or beaded arm having just the thickness required for imparting the necessary flexibility to the guiding action exerted thereby is definitely protected against any compressive and swelling stress by the presence of the support 15. When the packing is assembled the support 15 will easily fit against a shoulder 17 of the piston, the packing being held against movement by fitting an anchoring bead 18 in a groove 19 formed in the piston beyond the shoulder 17 and separated therefrom by a rib 20 which can easily be cleared by the bead 18 by the provision of a hinge forming thin portion 21 connecting the anchoring bead to the packing body.

Figure 5:
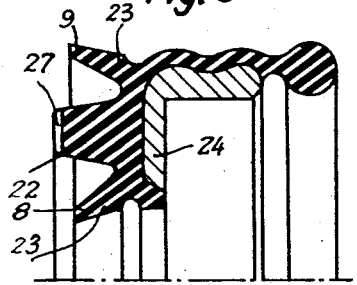
FIGURES 5 and 6 are similar views showing a piston packing adapted furthermore to act as a shock-absorber upon completion of its stroke in one direction.
Figure 6:
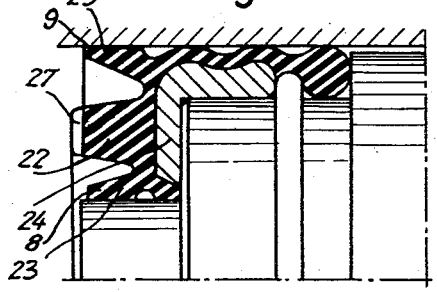

According to a modified embodiment illustrated in FIGS. 5 and 6, the operative portion that faces the fluid under pressure may be formed with an annular thrust portion 22 projecting slightly from the plane of the lips 8, 9 and from the corresponding face of the piston, so as to damp out shocks at the end of the piston travel.

It is clear that this shock-absorbing thrust portion 22 is formed between the hinge-like portions 23 of the lips and that without impairing the lip flexibility this thrust portion, as it is properly supported by the portion 24 of its metal support, may withstand a relatively high pressure without affecting whatsoever the efficiency of the packing.

FIGURE 9 illustrates a typical application of these two unidirectional packings mounted on the ends of a piston 25 of a hydraulic cylinder 26. It will be seen that as in the case of FIGS. 5 and 6, the annular thrust portion 22 is formed with radial notches 27 to enable the fluid under pressure to soak nearly all the piston surface and permit the "unsticking" of this piston when it abuts against the end wall 28 of the cylinder. This figure also shows a typical application of the gland packing of FIG. 1.

Figure 7:
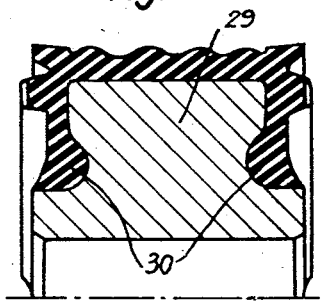
FIGURES 7 and 8 are similar views illustrating a piston packing providing a bidirectional sealing action and also a shock-absorbing action.
Figure 8:
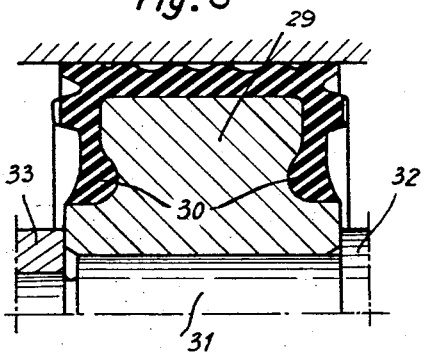

FIGURES 7 and 8 of the drawings illustrate a bidirectional sealing device of which the resilient operative portion is vulcanized on a metal support 29 constituting the piston body proper. This packing has the essential common features of the packing constructions described in the preceding paragraphs, that is, the bearing-forming beads, the sliding lips, the annular thrust portion, and the connection between the resilient portion and the piston is reinforced by opposite inner beads 30. In this case, it is apparent that the piston support 29 is mounted on the rod 31 and locked against a shoulder 32 by a ring 33, the joint between the piston 29 and rod 31 being rendered leak-proof by any suitable and known means.

FIGURE 10 illustrates a practical embodiment of a modification of the bidirectional sealing device in the case of a hydraulic cylinder 34. The support 29', constituting also in this example the piston body, is sealed against leaks relative to the rod 31 by a toroidal gasket 35.

It is particularly worth pointing out that the resilient portion of the packing of FIG. 10 is formed with two static lips, its connection with the support being reinforced in the region of the bearing-forming beads as in the preceding unidirectional packings. As in the case of the hydraulic cylinder illustrated in FIG. 9, the piston stroke is damped in one direction only as the packing is formed with a shock-absorbing pad 22 on one side only.

FIGURES 11 and 12 illustrate unidirectional sealing devices of which the resilient operative portion is fitted on a support designed to permit the juxtaposition or combination of any suitable number of packings in view of constituting a sealing device of unidirectional or bidirectional type, which comprises several sealing zones and is adapted to be easily fitted or removed.

In these examples the support consists of a ring of angle-shaped radial section having one arm 36 adapted to carry the operative portion of the packing and the other arm 37 extending in the direction opposite to that of the sealing lips, so that by placing two packings of the same design one behind the other and in the same direction the static lip of the rear packing will fit over the extension of the support of the front packing.

FIGURE 13 illustrates the practical application of packings of the type shown in FIG. 11 to the construction of a bidirectional sealing device fitted between a piston 38 and a cylinder 39. In this figure it is evident that the packings are threaded on the piston body to constitute two groups of each two packings mounted in opposition between a shoulder 40 of the piston and a ring 41. This ring 41 is locked on the piston by means of nuts 42 and assembled with the interposition of a toroidal sealing gasket 43 after the mounting of these packings.

It will be noted that the static lips of the extreme packings of this assembly engage the outer cylindrical surfaces of the piston flange or shoulder 40 and the locking ring 41, respectively, all the static and sliding lips being slightly prestressed as will clearly appear from a comparison between FIGURES 13 and 11.

Similarly, FIG. 14 illustrates a typical embodiment of packings of the type shown in FIG. 12, in the case of a gland packing having two guiding and sealing zones. The lips of these packings extend toward the pressure fluid zone and are held in position by a lock ring 45 in a case 46 formed in the bottom of the cylinder 47. The static lip of the front packing is fitted in a prestressed condition against a bearing wall 48 formed in the gland packing cavity, the sliding lips being also prestressed and engaging the rod 49 guided by the packing beads.

While the invention has been described in detail with respect to a few preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

I claim:

1. A packing adapted to form a fluid-tight joint between a sliding member and the wall of a cylinder member containing a fluid under pressure and slidably receiving said sliding member, said packing comprising at least one metal support and an operative portion of resilient material secured to said metal support, said support being formed with a cylindrical surface and being adapted to impart resistance to deformation to said operative portion, said operative portion comprising an annular body formed in the direction of the sliding movement with an extension engaging said cylindrical surface of said support and comprising circular beads defining guide bearings between said two members, said annular body having an extension on at least one side of the support adapted to face the fluid under pressure, said extension carrying at least one sliding sealing lip prestressed against the surface of the member with which it co-acts and partially surrounding the support, said cylindrical surface of said support facing the surface of the member against which the sliding lip is prestressed.

2. A packing adapted to form a fluid-tight joint between a sliding member and the wall of a cylinder member containing a fluid under pressure and slidably receiving said sliding member, said packing comprising at least one metal support and an operative portion of resilient material secured to said metal support, said support being formed with a cylindrical surface and being adapted to impart resistance to deformation to said operative portion, said operative portion comprising an annular body formed in the direction of the sliding movement with an extension engaging said cylindrical surface of said support and comprising circular beads defining guide bearings between said two members, said annular body having an extension on at least one side of the support adapted to face the fluid under pressure, said extension carrying at least one sliding sealing lip prestressed against the surface of the member with which it co-acts, and partially surrounding the support, said cylindrical surface of said support facing the surface of the member against which the sliding lip is prestressed, said extension carrying a static sealing lip on the same side as the sliding lip, said static sealing lip being adapted to engage a cylindrical surface which is in fixed relation with the other member.

3. A packing as defined in claim 1, further comprising a gland packing having a recess and including a locking ring and wherein said support is formed with an external assembling portion adapted to be received in said recess of the gland packing, said operative portion being provided with a static sealing lip and partially surrounding the support on the side opposite said sliding and static lips and being clamped between said support and the locking ring of the gland-packing.

4. A packing as defined in claim 1, adapted for use with a piston having a shoulder and a groove wherein said support and said operative portion have a substantially L-shaped radial section, with the arm of the L adapted to face the fluid under pressure carrying a static lip and said sliding lip, said support being adapted to engage said shoulder formed on the piston, the resilient portion of the other arm of the L having an extension beyond said support in the form of an anchoring bead adapted to fit in said groove of the piston and to engage the wall of the cylinder.

5. A packing as defined in claim 1, wherein the resilient operative portion overlies at least partially the opposite faces and the radially outer surface of the support, said support being adapted to engage said member with its radially-inner surface and to be locked to said member.

6. A packing as defined in claim 2, wherein the operative portion of resilient material comprises an annular thrust portion projecting between the sealing lips beyond the common plane of said lips and from the member on which the packing is fitted.

7. A packing as defined in claim 2, wherein the operative portion of resilient material comprises an annular thrust portion projecting between the sealing lips beyond the common plane of said lips and from the member on which the packing is fitted, said annular thrust portion being formed with radial notches.

8. A packing adapted to form a fluid-tight joint between a sliding member and the wall of a cylinder member containing a fluid under pressure and slidably receiving said sliding member, said packing comprising at least one metallic support in the form of a ring of substantially L-shaped radial section, one arm of said L having a radial extension carrying an operative sealing portion of resilient material secured thereto, said radial extension having a cylindrical surface and being adapted to impart resistance to deformation to said operative portion, said operative portion comprising an annular body formed in the direction of the sliding movement with an extension engaging said cylindrical surface and further comprises circular beads defining guiding bearings between said two members, the other arm of the L having an axial cylindrical extension of a predetermined thickness, said operative portion having at one end a sliding sealing lip prestressed against the surface of the member with which it coacts and a static sealing lip positioned to engage the cylindrical surface of the annular cylindrical portion of said axial extension of predetermined thickness which is in fixed relation with the other member.

9. An assembly comprising a sliding member and a cylinder member receiving said sliding member, a plurality of packing units mounted to provide a fluid-tight seal between said cylinder member and said sliding member, each packing unit comprising a metallic support in the form of a ring of substantially L-shaped radial section, one arm of said L carrying an operative sealing portion of resilient material secured thereto, said operative portion having at one end at least one sliding sealing lip prestressed against the surface of the member of which it coacts and a static sealing lip positioned to engage the other member and the other arm of said L having an extension on the side of said support opposite said lips, said sealing units being disposed in at least one pair between said cylinder member and said sliding member with the lips of the elements of each pair facing in the same axial direction.

10. An assembly comprising a sliding member and a cylinder member receiving said sliding member, a plurality of packing units mounted to provide a fluid-tight seal between said cylinder member and said sliding member, each packing unit comprising a metallic support in the form of a ring of substantially L-shaped radial section, one arm of said L carrying an operative sealing portion of resilient material secured thereto, said operative portion having at one end at least one sliding sealing lip prestressed against the surface of the member of which it coacts and a static sealing lip positioned to engage the other member and the other arm of said L having an extension on the side of said support opposite said lips, said sealing units being disposed in a plurality of pairs between said cylinder member and said sliding member with the lips of the elements of each pair facing in the same axial direction.

11. An assembly comprising a sliding member and a cylinder member receiving said sliding member, a plurality of packing units mounted to provide a fluid-tight seal between said cylinder member and said sliding member, each packing unit comprising a metallic support in the form of a ring of substantially L-shaped radial section, one arm of said L carrying an operative sealing portion of resilient material secured thereto, said operative portion having at one end at least one sliding sealing lip prestressed against the surface of the member of which it coacts and a static sealing lip positioned to engage the other member and the other arm of said L having an extension on the side of said support opposite said lips, said sealing units being disposed in a plurality of pairs between said cylinder member and said sliding member with the lips of the elements of each pair facing in the same axial direction, but with alternate pairs facing in opposite axial directions.

12. An assembly comprising a sliding member and a cylinder member receiving said sliding member, a plurality of packing units mounted to provide a fluid-tight seal between said cylinder member and said sliding member, each packing unit comprising a metallic support in the form of a ring of substantially L-shaped radial section, one arm of said L carrying an operative sealing portion of resilient material secured thereto, said arm being formed with a cylindrical surface and being adapted to impart resistance to deformation to said operative portion, said operative portion comprising an annular body formed in the direction of the sliding movement with an extension engaging said cylindrical surface of said arm and comprising circular beads defining guide bearings between said two members, said operative portion having at one end at least one sliding sealing lip prestressed against the surface of the member with which it coacts and a static sealing lip positioned to engage a cylindrical surface which is in fixed relation with the other member and the other arm of said L having an axial extension on the side of said support opposite said lips, said sealing units being disposed between said cylinder member and said sliding member with the lips of the elements of each unit facing in the same axial direction, the static lip of the end packing of said plurality of units being adapted to engage the member which is not in contact with the sliding lips, and the static lip of the other packing units being adapted to engage the axial extension of the adjacent packing unit which is faces.

13. An assembly comprising a sliding member and a cylinder member receiving said sliding member, a plurality of packing units mounted to provide a fluid-tight seal between said cylinder member and said sliding member, each packing unit comprising a metallic support in the form of a ring of substantially L-shaped radial section, one arm of said L carrying an operative sealing portion of resilient material secured thereto, said arm being formed with a cylindrical surface and being adapted to impart resistance to deformation to said operative portion, said operative portion comprising an annular body formed in the direction of the sliding movement with an extension engaging said cylindrical surface of said arm and comprising circular beads defining guide bearings between said two members, said operative portion having at one end at least one sliding sealing lip prestressed against the surface of the member of which it coacts and a static sealing lip positioned to engage the cylindrical surface which is in fixed relationship with the other member, and the other arm of said L having an axial extension on the side of said support opposite said lips, said plurality of packing units being defined by two sets of packing units disposed between said cylinder member and said sliding member with the lips of one set facing in the opposite axial direction from the lips of the other set, the static lips of the end packing units of said set being adapted to engage the member which is not in contact with the sliding lips, and the static lip of the other packing units being adapted to engage the axial extended arm of the adjacent packing unit which it faces.

References Cited in the file of this patent

UNITED STATES PATENTS

| | | |
|---|---|---|
| 2,188,106 | Caldwell | Jan. 23, 1940 |
| 2,295,678 | Miller | Sept. 15, 1942 |
| 2,318,757 | Christenson | May 11, 1943 |
| 2,387,182 | Procter | Oct. 16, 1945 |
| 2,446,380 | Meyers et al. | Aug. 3, 1948 |
| 2,489,715 | Mark et al. | Nov. 29, 1949 |
| 2,571,486 | Reynolds | Oct. 16, 1951 |
| 2,606,086 | Rappl | Aug. 5, 1952 |
| 2,772,931 | Biedermann | Dec. 4, 1956 |
| 2,840,426 | Salansky | June 24, 1959 |